(12) United States Patent
Fukumoto et al.

(10) Patent No.: US 9,517,810 B2
(45) Date of Patent: Dec. 13, 2016

(54) GLOVE COMPARTMENT

(71) Applicants: NIFCO INC., Yokosuka-shi, Kanagawa (JP); HONDA MOTOR CO., LTD., Minato-ku, Tokyo (JP)

(72) Inventors: Mitsuru Fukumoto, Yokosuka (JP); Rui Maeda, Wako (JP)

(73) Assignees: NIFCO INC., Yokosuka-Shi, Kanagawa (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/628,915

(22) Filed: Feb. 23, 2015

(65) Prior Publication Data
US 2015/0240535 A1 Aug. 27, 2015

(30) Foreign Application Priority Data
Feb. 27, 2014 (JP) ................. 2014-036544

(51) Int. Cl.
*B62K 19/46* (2006.01)
*B62J 9/00* (2006.01)
*B60R 11/00* (2006.01)

(52) U.S. Cl.
CPC ........ *B62K 19/46* (2013.01); *B60R 2011/0096* (2013.01); *B62J 9/003* (2013.01)

(58) Field of Classification Search
CPC ............... B60R 7/06; B60R 2011/0005; B60R 2011/0096; B60R 2325/306; B62J 9/003; B62J 9/02; B62K 19/46; E05B 17/20; E05B 17/2003; E05B 17/2084; E05B 17/2088; Y10T 70/20; Y10T 70/7424; Y10T 70/7915
See application file for complete search history.

(56) References Cited

U.S. PATENT DOCUMENTS 2,454,904 A * 11/1948 Wylie ................. E05B 17/2003
                                                  292/346
3,779,597 A * 12/1973 Uchida .................. B62J 11/005
                                                  211/4
4,473,251 A * 9/1984 Murayama .............. B60R 11/02
                                                  296/78.1

(Continued)

FOREIGN PATENT DOCUMENTS

DE       102014006474 A1 * 10/2015 ............. E05B 17/20
JP       EP 0482610 A1 *  4/1992 .............. B62J 35/00

(Continued)

*Primary Examiner* — Glenn Dayoan
*Assistant Examiner* — Paul Chenevert
(74) *Attorney, Agent, or Firm* — Manabu Kanesaka

(57) ABSTRACT

A glove compartment includes a case main body; a lid body connected to the case main body by a hinge; and a lock mechanism locking the lid body to the case main body at a closed position relative to the case main body. The lock mechanism includes a fixation claw fixed to the lid body; and a movable claw slidably attached to the case main body. When the movable claw is located in an engagement position engaged with the fixation claw, the lid body is locked to the case main body. When the movable claw slidingly moves to a release position disengaging from the fixation claw, the lid body can be opened. A shielding wall is provided, which partially shields the movable claw relative to an outside when the lid body is located at the closed position, so as to prevent a theft of housed articles.

8 Claims, 7 Drawing Sheets

(56) References Cited

U.S. PATENT DOCUMENTS

| | | | | |
|---|---|---|---|---|
| 4,619,476 A * | 10/1986 | Kawasaki | ................... | B62J 7/00 296/37.1 |
| 5,025,883 A * | 6/1991 | Morinaka | ................... | B62J 7/00 180/219 |
| 5,303,795 A * | 4/1994 | Buell | ..................... | B62K 19/46 180/219 |
| 6,240,754 B1 * | 6/2001 | Petersen | ................. | E05B 83/36 292/346 |
| 6,428,075 B2 * | 8/2002 | Kamemizu | .............. | B62H 5/00 292/210 |
| 7,475,929 B2 | 1/2009 | Yamada | | |
| 7,878,035 B2 * | 2/2011 | Yamaguchi | ............... | B60R 7/06 200/43.11 |
| 2009/0152877 A1 * | 6/2009 | Kim | ....................... | E05B 83/30 292/174 |
| 2015/0197297 A1 * | 7/2015 | Maeda | ................... | B62H 5/001 70/158 |
| 2015/0240539 A1 * | 8/2015 | Abe | ......................... | B60R 7/06 296/37.12 |

FOREIGN PATENT DOCUMENTS

| | | | | |
|---|---|---|---|---|
| JP | FR 2738544 A1 * | 3/1997 | .............. | B62J 35/00 |
| JP | 2009-96309 A | 5/2009 | | |
| JP | WO 2014192588 A1 * | 12/2014 | .............. | B62J 9/003 |

\* cited by examiner

GLOVE COMPARTMENT

RELATED APPLICATIONS

The disclosure of Japanese Patent Application No. 2014-036544, filed on Feb. 27, 2014, is incorporated by reference in the application.

BACKGROUND OF THE INVENTION AND RELATED ART STATEMENT

The present invention relates to a glove compartment for housing an article provided on a vehicle. Especially, the present invention relates to the glove compartment comprising a lock mechanism for preventing a theft of a housed article.

As for a glove compartment for an automobile, there is known a glove box. In Japanese Patent Application Publication No. 2011-247084, there is described an opening/closing device for a glove box, and the opening/closing device comprises a lock device locking a lid body in a closed state; and a button-like handler releasing a lock thereof.

On the other hand, in Japanese Patent Application Publication No. 2009-96309, there is proposed a glove compartment for a motorcycle. The glove compartment comprises a storage box disposed inside a handle cover; and a lid body which can open and close an upper side of the storage box thereof.

As with the device described in the Japanese Patent Application Publication No. 2011-247084, if the glove compartment is provided inside a vehicle interior isolated from the outside, articles inside the vehicle interior can be prevented from a theft by a lock of a door and the like, so that a necessity for providing antitheft measures for the glove compartment itself is low. However, as with the glove compartment described in the Japanese Patent Application Publication No. 2009-96309, in the glove compartment wherein the lid body is exposed to the outside, there is a risk that the housed article may be stolen, so that some antitheft measures are required.

However, recently, an electronic toll collection system (ETC) for a motorcycle has prevailed, and a demand for housing valuables such as an ETC card and the like in the glove compartment and the like provided with the antitheft measures is expected.

Also, in such a glove compartment, the lid body is exposed to the outside, so that it is important not to inhibit airflow during driving, and a design property. Therefore, in order to provide the antitheft measures, it is required to prevent inhibitions of the airflow during driving, and of the design property.

In view of the aforementioned circumstances, a main object of the present invention is to improve a glove compartment for a vehicle wherein a lid body thereof is exposed to the outside in such a way as to provide measures for preventing a theft of a housed article without inhibiting the airflow and the design property. A second object of the present invention is to provide a glove compartment for a vehicle which can be harmonically integrated into a cowl of a motorcycle.

Further objects and advantages of the invention will be apparent from the following description of the invention.

SUMMARY OF THE INVENTION

One aspect of the present invention is a glove compartment (2) provided in a vehicle (4) and capable of housing an article, and the glove compartment (2) comprises a case main body (10) defining a storage chamber (14) capable of housing the article; a lid body (12) connected to the case main body by a hinge (24) to open and close an opening (20) of the storage chamber, and forming one portion of an outline of the vehicle; and a lock mechanism (36) capable of locking the lid body relative to the case main body at a closed position closing the opening of the storage chamber. The lock mechanism includes a fixation claw (68) provided in either one of the case main body or the lid body; a movable claw (40) provided in another of the case main body or the lid body to be displaceable between an engagement position engaging with the fixation claw and a release position disengaging from the fixation claw; and an operation member (54) displacing the movable claw from the engagement position to the release position. Also, when the lid body is located at the closed position, there is provided a shielding wall (86) disposed in the case main body or the lid body in such a way as to be positioned on an inner side more than the outline of the vehicle which the lid body forms, and near the movable claw on the outline side more than the movable claw.

According to the structure, a picking action, which releases a lock by inserting a tool into a gap between the case main body and the lid body from an outside of the vehicle and directly moving the movable claw, can be prevented by the shielding wall so as to prevent a theft of a housed article in the glove compartment. Also, the shielding wall is provided on an inner side more than an outer surface of the vehicle so as not to inhibit airflow at a vehicle running time, and not to impair a design property of the vehicle.

As for another aspect of the present invention, in the aforementioned structure, the shielding wall is integrally formed with the fixation claw.

According to the structure, a structure of the lock mechanism can be simplified so as to facilitate a production thereof.

As for another aspect of the present invention, in the aforementioned structure, the lock mechanism includes an urging member (52) urging the movable claw toward the engagement position, and in at least one of the fixation claw and the movable claw, there is provided an inclined face (42, 78) colliding against another of the corresponding fixation claw and movable claw when the lid body is displaced toward the closed position, so as to displace the movable claw into the release position against an urging force of the urging member.

According to the structure, with a simple structure, the lid body can be locked in the closed position.

As for another aspect of the present invention, in the aforementioned structure, the fixation claw and the movable claw respectively include abutment faces wherein at least one portion thereof abuts against each other when the movable claw is located at the engagement position. Also, at least one of the abutment faces forms a projection piece (82) extending along a displacement direction of the movable claw.

According to the structure, when the movable claw is displaced from the engagement position to the release position, a frictional resistance between the movable claw and the fixation claw can be reduced. Also, a malfunction of the lock mechanism, which may occur by trash, sand, or the like stuck in between the fixation claw and the movable claw, can be prevented.

As for another aspect of the present invention, in the aforementioned structure, the lock mechanism is provided in the case main body, and the movable claw is slidably provided in a direction approximately parallel to an axis line of the hinge on a side facing the hinge of the opening.

According to the structure, a weight increase of the lid body is prevented, and a force required for displacing the lid body into the closed position can be reduced so as to facilitate opening/closing operations of the lid body.

As for another aspect of the present invention, in the aforementioned structure, a plurality of fixation claws (fixation claw pieces) is provided at an interval in the direction approximately parallel to the axis line of the hinge, and a plurality of movable claws (movable claw pieces) is provided at an interval respectively in a long connection member (46) slidably extending in the direction approximately parallel to the axis line of the hinge in such a way as to correspond to the plurality of fixation claws.

According to the structure, a plurality of portions is locked so as to stabilize the lid body located in the closed position and to resist wind pressure accompanied by running of the vehicle as well.

As for another aspect of the present invention, in the aforementioned structure, the operation member includes a push button (58) disposed at a position defining one portion of the outline of the vehicle; conversion mechanisms (46, 62) converting a movement of the push button into a sliding movement of the connection member; and a movable lock piece (94) provided in the case main body to be displaceable to selectively restrict the movement of the push button.

According to the structure, when the movement of the push button is not restricted, a user of the vehicle can easily open and close the lid body of the glove compartment using the push button, and when the movement of the push button is restricted, the lid body of the glove compartment can be prevented from being opened by a third party. As for a control device of the movable lock piece, even though an operation is complicated, if the control device of the movable lock piece with a high crime-prevention function, for example, a key and a key cylinder, is selected, the glove compartment can combine a crime prevention property and user-friendliness.

As for another aspect of the present invention, in the aforementioned structure, the case main body includes a flange (22) wherein the lock mechanism is provided on a marginal edge on the side facing the hinge, and the movable claw protrudes upward from a hole (48) provided in the flange, and the flange and the marginal edge on the side facing the hinge of the lid body respectively face in a direction orthogonal to the flange when the lid body is located in the closed position.

According to the structure, the lock mechanism can be provided in the glove compartment without inhibiting the design property of the vehicle and the airflow at the vehicle running time.

As for another aspect of the present invention, in the aforementioned structure, the vehicle is the motorcycle (4), and an outer surface of the lid body forms one portion of an outer outline of a cowl of the motorcycle.

According to the structure, the glove compartment is installed in a cowl portion so as not to restrict a steering space of a driver, and a limited space inside the motorcycle can be effectively used. Moreover, the glove compartment can be disposed in such a way not to inhibit the airflow at the vehicle running time, and not to damage the design property of the motorcycle.

According to the present invention, the glove compartment for a vehicle can be provided with measures for preventing a theft of a housed article without inhibiting the airflow and the design property.

BRIEF DESCRIPTION OF THE DRAWINGS

FIGS. 5(a), 5(b), and 5(c) are enlarged perspective views showing an operation-member lock mechanism of the glove compartment according to the embodiment, wherein FIG. 5(a) shows a lock state, FIG. 5(b) shows a lock release state, and FIG. 5(c) shows a state wherein the operation member is pushed in the lock release state;

DETAILED DESCRIPTION OF PREFERRED EMBODIMENTS

Figure 1:
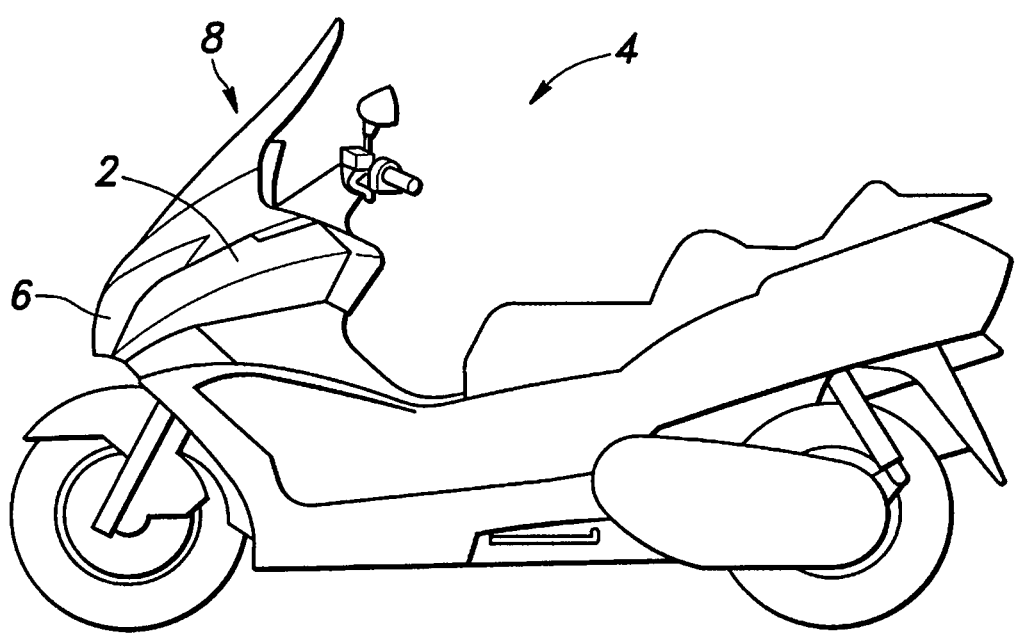
FIG. 1 is a side view of a motorcycle wherein a glove compartment is installed according to an embodiment.

Hereinafter, an embodiment of the present invention will be explained with reference to the drawings. FIG. 1 is a side view of a motorcycle 4 (a vehicle) wherein a glove compartment 2 is installed according to the embodiment. At a front center of the motorcycle 4, there is provided a head light 6, and at right and left thereof, there are provided cowls 8 fixed to a vehicle body. The cowls 8 define an outer outline of a front streamline shape of the motorcycle 4. The glove compartment 2 is provided respectively at both positions adjacent to the right and left of the head light 6 of the motorcycle 4, and a surface exposed to an outside thereof forms one portion of an outer outline of the cowl 8. Consequently, at a running time of the motorcycle 4, the glove compartment 2 does not inhibit airflow near a surface of the motorcycle 4 so as not to damage a design property.

Figure 2:
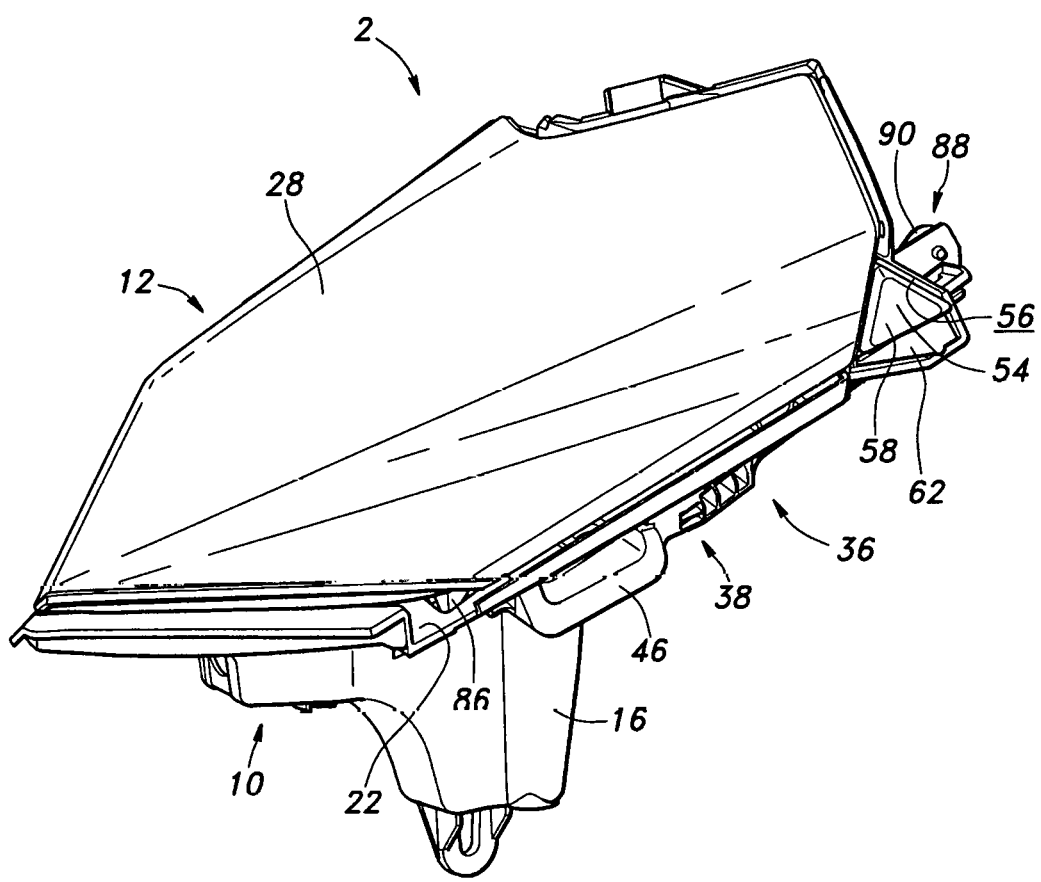
FIG. 2 is a front view of the glove compartment, and shows a state wherein a lid body is located in a closed position according to the embodiment.
Figure 3:
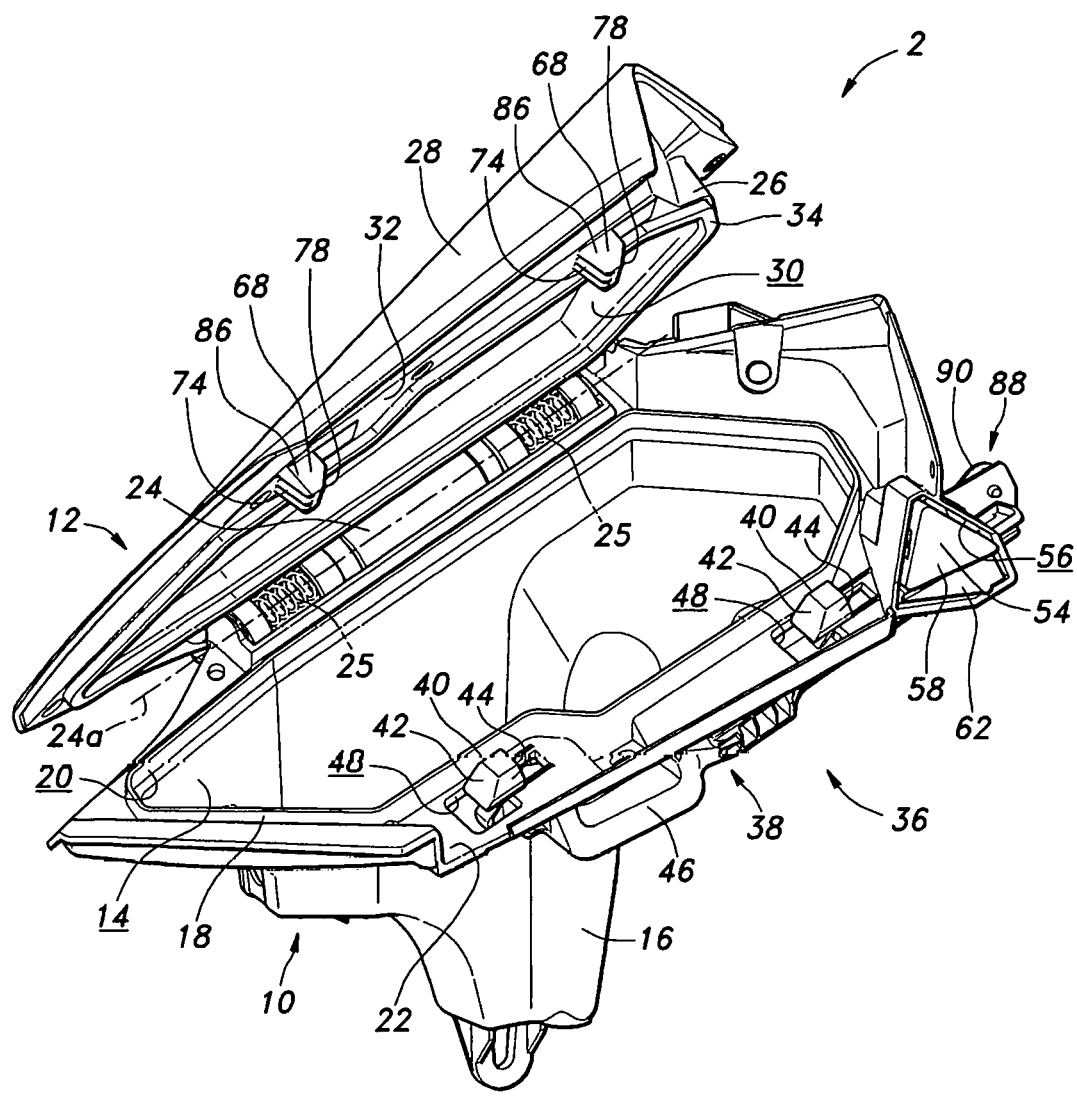
FIG. 3 is a front view of the glove compartment, and shows a state wherein the lid body is located in an open position according to the embodiment.

FIG. 2 and FIG. 3 are front views of the glove compartment 2, wherein FIG. 2 shows a state wherein a lid body 12 is closed relative to a case main body 10, and FIG. 3 shows a state wherein the lid body 12 is open relative to the case main body 10. The glove compartment 2 shown in FIG. 2 and FIG. 3 is attached to a left side viewed by a passenger of the motorcycle 4. The glove compartment 2 attached to a right side of the motorcycle 4 has a symmetrical shape to the glove compartment 2 shown in FIG. 2 and FIG. 3.

The case main body 10 includes an outer wall 16 defining a storage chamber 14 extending in a back downward direction. The case main body 10 may be a molded article using a resin as a raw material. The storage chamber 14 includes an opening 20 facing upward in a state wherein the front and a lateral side of the motorcycle 4 inclines slightly downward. The opening 20 has an approximately rectangular shape. Upper and lower end edges in a longitudinal direction of the opening 20, i.e., two end edges slightly extending toward a vehicle body center as moving toward the front from the back of the motorcycle 4 incline downward toward the vehicle body center overall. Inside the case main body 10, there can be provided an ACC socket, an ETC unit, and the like, or the case main body 10 can be used for storing articles such as gloves, a U-shaped lock, and the like.

In the present embodiment, the bottom of the storage chamber 14 deepens on the inboard side, and shallows on the outboard side in order to maximize a usable space in a vehicle body. Also, a front to rear width of the storage chamber 14 becomes narrower toward the inboard side and the outboard side.

At a peripheral edge of the opening 20 of the outer wall 16 defining the opening 20, there are formed an axial directional flange 18 protruding in a direction orthogonal to an opening 20 face, and an outer directional flange 22 extending outward in a direction approximately parallel to the opening 20 face.

The lid body 12 is connected by a hinge 24 near an upper edge of the opening 20 of the case main body 10.

The hinge 24 includes an axis line 24a extending approximately parallel to the upper edge, and the lid body 12 opens and closes as an axis of the axis line 24a. Also, in the hinge 24, there include torsion coil springs 25 urging the lid body 12 toward an opening direction. Also, the hinge 24 includes a stopper (not shown in the drawings) controlling the lid body 12 in such a way that an open position (FIG. 3) of the lid body 12 forms an angle of approximately 80 to 100 degrees relative to a closed position (FIG. 2), so that the lid body 12 urged toward the opening direction by the torsion coil springs 25 is controlled from turning into the opening direction at the open position.

The lid body 12 includes a lid-body main body 26 reinforced by a plurality of ribs (not shown in the drawings) provided on an outer surface; and a surface material 28 attached to the outer surface of the lid-body main body 26. An outer surface of the surface material 28 forms a smooth surface in such a way as to form one portion of the outer outline of the cowl 8. The lid-body main body 26 and the surface material 28 are molded articles using a resin as a raw material. The lid-body main body 26 forms a curved shape bulging outward (upward), and at a center of a back surface side, there is defined a concave portion 30, and an outer peripheral portion of the concave portion 30 forms a flat flange 32 extending to an outside. By providing the concave portion 30, a rigidity of the lid-body main body 26 is increased, and a volume of the storage chamber 14 can be maximized as well. Along an opening outer periphery of the concave portion 30 in the flange 32, there is attached a seal member 34. The seal member 34 is made of a raw material having a flexibility or an elasticity such as a foamed resin, a rubber, and the like, and when the lid body 12 is located in the closed position, the seal member 34 is disposed in such a way as to pressure-contact with the axial directional flange 18 of the case main body 10 to prevent foreign material such as rainwater, dust, and the like from entering into the storage chamber 14. A portion on a case main body 10 side of the hinge 24 is connected to a portion on an upper edge side of the flange 32.

When the lid body 12 is located in the closed position, a marginal edge of the lid body 12 and a marginal edge of the case main body 10 face each other in an up-and-down direction. Consequently, compared to a case wherein both bodies face each other in a horizontal direction, an unevenness of the cowl 8 of the motorcycle 4 is reduced to suppress an air resistance during driving, and to improve the design property.

Figure 4:
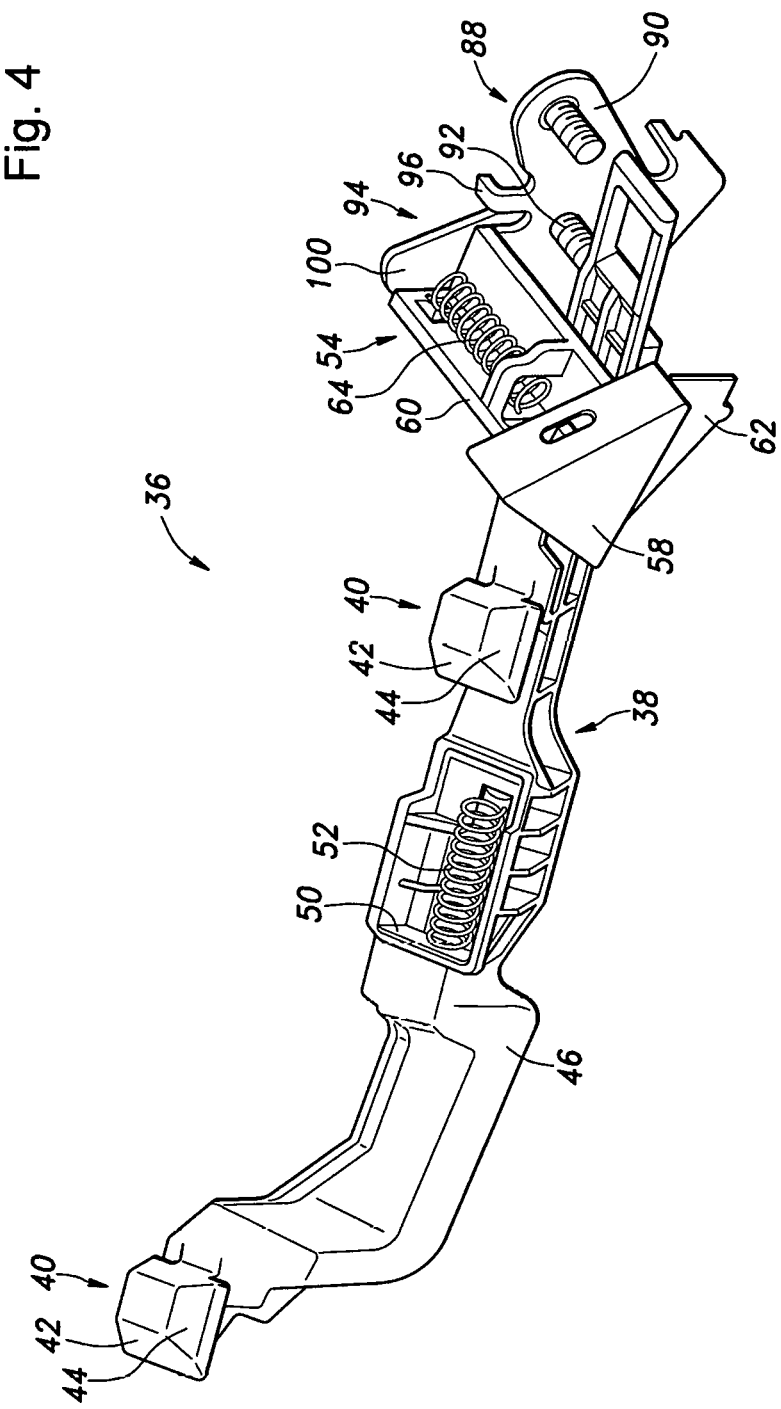
FIG. 4 is a perspective view showing one portion of a lock mechanism of the glove compartment according to the embodiment.

The glove compartment 2 includes a lock mechanism 36 locking the lid body 12 located in the closed position relative to the case main body 10. FIG. 4 shows members attached to the case main body 10 in the lock mechanism 36.

A lock member 38 forming one portion of the lock mechanism 36 includes two movable claws 40 connected by a connection member 46. The lock member 38 may be a molded article using a resin as a raw material. The lock member 38 is attached to a lower edge side of the outer directional flange 22 of the case main body 10, i.e., a side opposite to the upper edge where the hinge 24 is provided (hereinafter, in the case main body 10 and the lid body 12, an edge portion on a side opposite to an edge portion where the hinge 24 is provided is called an opening side portion). Also, the lock member 38 is a long material approximately extending along the opening 20 to be slidable approximately along the opening 20. Incidentally, in the following explanation, unless otherwise mentioned, a sliding direction of the lock member 38 is called a front-back direction, and a direction orthogonal to the sliding direction of the lock member 38 and approximately corresponding to an up-and-down direction of the motorcycle 4 is called the up-and-down direction. The lock member 38 protrudes in such a way as to be orthogonal from an axial direction thereof, and includes the two movable claws 40 disposed along the opening 20 of the case main body 10. The movable claw 40 is disposed in such a way as to protrude upward from the opening side portion of the outer directional flange 22. The movable claw 40 has a shape wherein approximately, a cuboid shape is deformed such that a front face has an inclined face 42 inclining backward as moving upward on the front face, and a buffer face 44 inclining to a hinge 24 side as moving upward on an upward portion from an intermediate position in the up-and-down direction on a lateral face on an opening side portion side. The two movable claws 40 are connected by the long connection member 46 disposed below the opening side portion of the outer directional flange 22, and extending in the axial direction of the lock member 38.

On the opening side portion of the outer directional flange 22, there are provided claw holes 48 penetrating connection parts between the movable claws 40 and the connection member 46. A back side of the claw hole 48 has a long hole extending along the opening 20 so that the lock member 38 guides the outer directional flange 22 to slide along an edge of the opening side portion of the outer directional flange 22. Also, a back end side of the connection member 46 extends up to a vicinity of a back end of the case main body 10, and is slidably supported in the case main body 10. A direction along the edge of the opening side portion of the opening 20 is determined by conforming to a shape of the cowl 8. In the present embodiment, the aforementioned direction inclines at a degree of approximately 2 to 3 degrees relative to an axial direction of the hinge 24, and is set in such a way as to retreat from an axial direction of the hinge 24 as moving backward; however, it may be said that the aforementioned direction is approximately parallel to the axial direction of the hinge 24. Incidentally, although it is not shown in the drawings, on the back end side of the connection member 46, there are formed two stoppers engaged in a wall of the case main body 10 in front and back of the wall thereof, and the stoppers define a slidable range of the lock member 38.

The lock mechanism 36 includes a compression coil spring 52 extending in the sliding direction of the lock member 38, and urging the lock member 38 forward in the sliding direction thereof. In the compression coil spring 52, a back end is attached to the case main body 10, and a front end abuts against a wall surface 50 provided at a center portion of the connection member 46 of the lock member 38, and facing backward.

The lock mechanism 36 includes an operation member 54 for moving the lock member 38 backward. The operation member 54 is received in a concave portion 56 provided behind the opening side portion of the outer directional flange 22 of the case main body 10. The operation member 54 may be a molded article using a resin as a raw material. The operation member 54 includes a push button 58 wherein a surface thereof is exposed to the outside of the glove compartment 2 and which can form one portion of the outer outline of the cowl 8. The surface of the push button 58 has an equilateral triangle shape. An axis member 60 having an L shape in a cross-sectional view extends from a reverse face of the push button 58, and the axis member is supported in the case main body 10 slidably in an extending direction thereof. Below a lateral end portion of the push button 58 of the axis member 60, there is fixed a cam member 62. The operation member 54 is urged in a direction that the push button 58 protrudes from the concave portion 56 by a compression coil spring 64 extending along the axis member 60 and wherein one end thereof is attached to the case main body 10.

In the lock mechanism 36, an interaction between the connection member 46 and the operation member 54 will be explained. The connection member 46 extends in such a way that the back end side thereof traverses the concave portion 56. Sliding directions of the axis member 60 of the push button 58 and the connection member 46 of the lock member 38 cross each other at a predetermined angle; however, when the push button 58 is pushed against an urging force of the compression coil spring 64, a movement in a direction along the axis member 60 of the push button 58 is converted to a sliding movement of the connection member 46 of the lock member 38. This conversion is carried out by a conversion mechanism formed by an inclined face provided in the cam member 62 and an inclined face provided at the back end side of the connection member 46. The respective slidable inclined faces of the cam member 62 and the connection member 46 are formed such that when the cam member 62 is pushed in together with the push button 58, respective sliding between both inclined faces moves the connection member 46 backward in the sliding direction of the lock member 38. The reverse face of the push button 58 is locked in the case main body 10 so as to control the push button 58 from moving in a pushing direction. When a user takes fingers off from the push button 58, the connection member 46 moves forward in the sliding direction by an urging force of the compression coil spring 52, and the operation member 54 moves in a direction of being pushed out of the concave portion 56 by a transmission of a force by the conversion mechanism or the urging force of the compression coil spring 64. On a loose end side of the axis member 60 of the operation member 54, there is provided a stopper 66 (see FIGS. 5(*a*), 5(*b*), and 5(*c*)), and the stopper 66 is locked in the case main body 10 so as to control a movement of the operation member 54 in the direction of being pushed out of the concave portion 56. When the stopper 66 is locked in the case main body 10, a surface of the stopper 66 forms one portion of the outer outline of the cowl 8.

Figure 6:
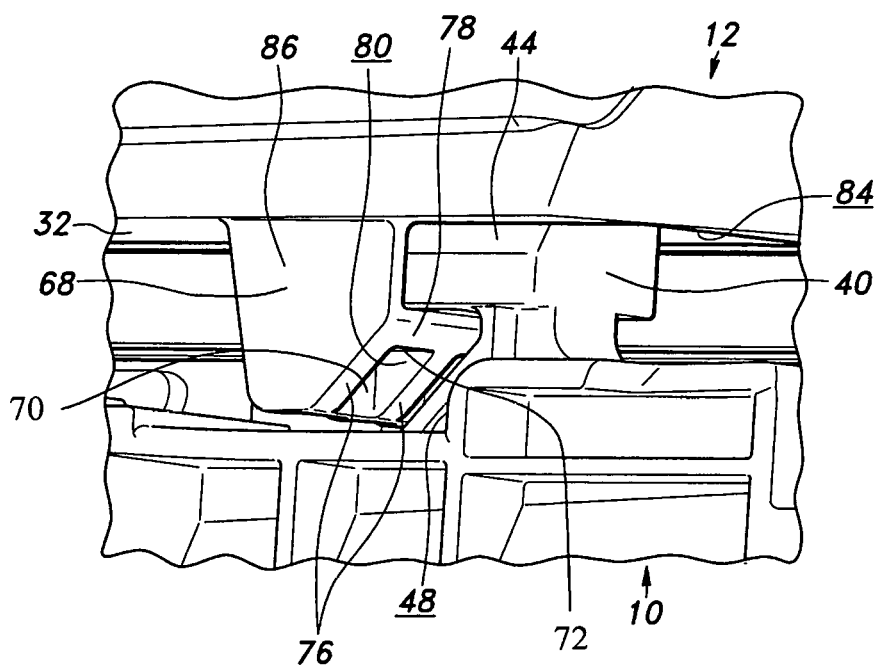
FIG. 6 is an enlarged view of the glove compartment wherein the lock state when the lid body is located in the closed position is shown by omitting a surface material of the lid body according to the embodiment.
Figure 7:
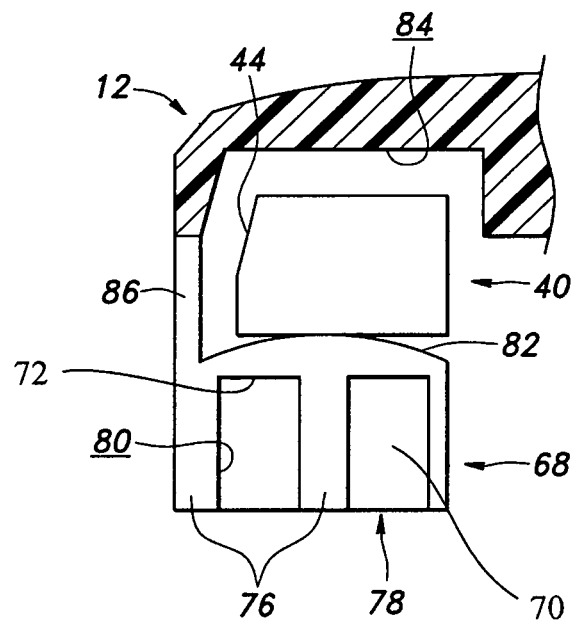
FIG. 7 is an enlarged cross-sectional view showing a locking state between a case main body and the lid body of the glove compartment according to the embodiment.

FIG. 6 is an enlarged view showing a lock state when the lid body 12 is located in the closed position by omitting the surface material 28 of the lid body 12. FIG. 7 is an enlarged cross-sectional view in a cross section taken along a just proximal rear side of the movable claw 40 orthogonal to a sliding direction of the movable claw 40 when the lid body 12 is located in the closed position. As shown in FIG. 3, FIG. 6, and FIG. 7, the lock mechanism 36 further includes a fixation claw integrally formed with the lid-body main body 26 and fixed relative to the lid-body main body 26. Two fixation claws 68 are provided on an opening side portion of the flange 32 of the lid-body main body 26 along the seal member 34 in such a way as to correspond to the two movable claws 40. The fixation claw 68 includes a vertical wall 70 protruding from a rear face of the flange 32 of the lid-body main body 26 and wherein a main surface thereof faces approximately in the front-back direction; a locking wall 72 protruding backward from a center of the vertical wall 70 and approximately parallel to the flange 32; a rib 74 extending in a direction approximately orthogonal to the flange 32 and reinforcing a front face of the vertical wall 70; and ribs 76 extending between a loose end side of the vertical wall 70 and the locking wall 72. The ribs 76 form an inclined face 78 which slides with the inclined face 42 of the movable claw 40 when the lid body 12 is displaced toward the closed position. Therefore, the inclined face 78 includes a concave portion 80 extending along the front-back direction between the ribs 76. A face on a flange 32 side of the locking wall 72 is locked in a lower face of the movable claw 40 when the lid body is located in the closed position. Also, the face on the flange 32 side of the locking wall 72 forms a projection piece 82 wherein an approximately center of a middle between the hinge side and the opening side portion side rises along the sliding direction of the connection member 46.

On a rear face side of the flange 32 of the lid body 12, a concave portion 84 receiving an upper portion of the movable claw 40 when the lid body 12 is located in the closed position is provided from an installation position of the vertical wall 70 of the fixation claw 68 to a back side. A back end of the concave portion 84 is positioned slightly backward more than a position of a back end face when the movable claw 40 moves backward. Also, a front side of the claw hole 48 of the outer directional flange 22 of the case main body 10 is enlarged in the width so as to allow a lower end side of the fixation claw 68 to pass through when the lid body 12 is located in the closed position.

The lock mechanism 36 further includes a shielding wall 86 integrally formed with the lid body 12 and the fixation claw 68. The shielding wall 86 connects between the opening side portion side of the locking wall 72 and the flange 32 in such a way as to be orthogonal to the flange 32 of the lid body 12 and the vertical wall 70. When the lid body 12 is located in the closed position, the shielding wall 86 shields a front end side of the movable claw 40 from the outside of the opening side portion side.

An operation relative to the case main body 10 of the lock mechanism 36 and the lid body 12 will be explained. The movable claw 40 can be displaced between an engagement position engaging with the fixation claw 68 and a release position disengaging from the fixation claw 68. When the lid body 12 is located in the open position wherein the lid body 12 opens the opening 20, the connection member 46 is urged by the compression coil spring 52 to dispose the movable claw 40 forward, so that the movable claw 40 is disposed in the engagement position. When a user turns the lid body 12 around the axis line 24*a* of the hinge 24 toward the closed position closing the opening 20, the fixation claw 68 collides against the movable claw 40 immediately before the lid body 12 reaches the closed position. Moreover, when the lid body 12 is turned, the inclined face 78 of the fixation claw 68 slides with respect to the inclined face 42 of the movable claw 40 so as to move the movable claw 40 backward against the urging force of the compression coil spring 52. At that time, since the inclined face 78 of the fixation claw 68 includes the concave portion 80 extending along the sliding direction, frictions on both the inclined face 78 of the fixation claw 68 and the inclined face 42 of the movable claw 40 decrease. After that, when an upper end of the inclined face 78 of the fixation claw 68 moves downward more than a lower end of the inclined face 42 of the movable claw 40, the movable claw 40 moves forward by the urging force of the compression coil spring 52 to reach the engagement position. At that time, the projection piece 82 of the fixation claw 68 and the lower face of the movable claw 40 abut against each other, so that the fixation claw 68 and the movable claw 40 are engaged. Accordingly, the lid body 12 is locked relative to the case main body 10 so as not to move toward the open position. Since the movable claw 40 has the buffer face 44, even if a hinge connection between the lid body 12 and the case main body 10 slightly wobbles, the buffer face 44 slides on an inner face of the concave portion 80 of the flange 32 of the lid body 12, and guides the lid body 12 to the closed position. Also, when the lid body 12 moves toward the closed position, a lower portion of the fixation claw 68 and the upper portion of the movable claw 40 are inserted to pass through or are received in the claw hole 48 and the concave portion 80, so that the fixation claw 68 and the movable claw 40 do not inhibit the turning of the lid body 12 toward the closed position even though the fixation claw 68 and the movable claw 40 have a predetermined size.

When a lock is released, the push button 58 is pushed. As mentioned above, when the push button 58 is pushed, the connection member 46 of the lock member 38 moves backward, so that the movable claw 40 moves backward as well to reach the release position. At that time, the lower face of the movable claw 40 slides with respect to a top portion of the projection piece 82, not an entire upper face of the locking wall 72 of the fixation claw 68, so that a friction accompanied by the sliding is small so as to prevent a malfunction due to foreign bodies such as sand, dust, dirt, and the like. When the movable claw 40 reaches the release position, an engagement between the fixation claw 68 and the movable claw 40 is released, so that the lid body 12 moves toward the open position by an urging force of the torsion coil spring 25 provided in the hinge 24. Incidentally, the projection piece 82 may be provided on the lower face of the movable claw 40 in place of the upper face of the locking wall 72 of the fixation claw 68, and may be provided on both the upper face of the locking wall 72 of the fixation claw 68 and the lower face of the movable claw 40.

Figure 5C:
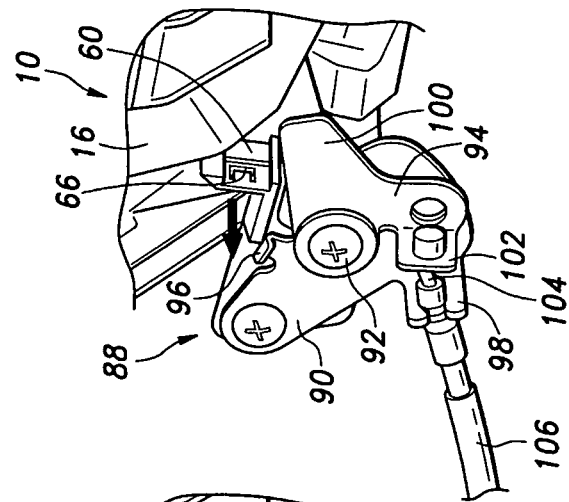
Figure 5B:
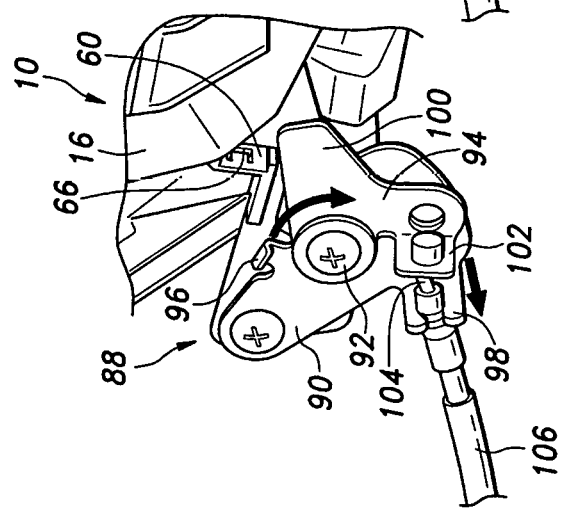
Figure 5A:
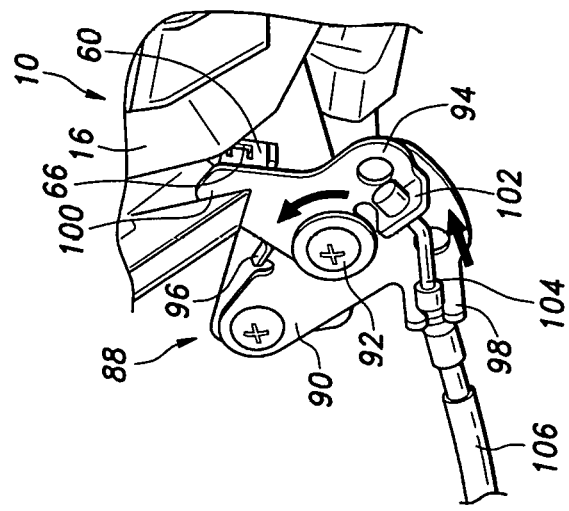

FIGS. 5(a), 5(b), and 5(c) are perspective views showing a periphery of the loose end side of the axis member 60 of the operation member 54. As shown in FIGS. 5(a), 5(b), and 5(c), the glove compartment 2 further includes an operation-member lock mechanism 88 locking the pushing of the push button 58. The operation-member lock mechanism 88 includes a fixation plate fixed to the case main body 10; and a movable plate 94 turnably connected relative to the fixation plate 90 by a pin 92. The fixation plate 90 and the movable plate 94 are made of a metal or a resin as a raw material, and have approximately a flat plate shape. A turning axis of the movable plate 94, i.e., the pin 92 is orthogonal to the fixation plate 90 and a main surface of the movable plate 94. The fixation plate 90 includes a locking projecting piece 96 positioned above the pin 92; and a tube holding projecting piece 98 provided at a position rotated clockwise around the pin 92 approximately at 130 to 140 degrees from the locking projecting piece 96. The locking projecting piece 96 and the tube holding projecting piece 98 are respectively formed by bending an end portion of the fixation plate 90 to a movable plate 94 side. The fixation plate 90 is disposed at a position which does not inhibit the operation member 54 from sliding. The movable plate 94 includes a lock piece 100 extending in a radial direction of the turning from the pin 92; and a wire holding projecting piece 102 provided at a position rotated clockwise around the lock piece 100 approximately at 90 to 100 degrees. The wire holding projecting piece 102 is provided by bending an end portion of the movable plate 94 to a side opposite to the fixation plate 90. A main surface of the wire holding projecting piece 102 is approximately orthogonal to a circumferential direction of the turning. The movable plate 94 is attached to the fixation plate 90 in such a way that the lock piece 100 is positioned in front (the right side in the drawings) of the locking projecting piece 96. The movable plate 94 is controlled from turning counterclockwise at a position wherein the lock piece 100 is locked in the locking projecting piece 96 (an operation-member lock position), and the movable plate 94 is controlled from turning clockwise at a position wherein the wire holding projecting piece 102 is locked in the tube holding projecting piece 98 (an operation-member unlock position).

As shown in FIG. 5(a), when the movable plate 94 is located at the operation-member lock position, the lock piece 100 is disposed near a loose end of the axis member 60 of the operation member 54 and at a position of aligning in the sliding direction of the axis member 60. Consequently, even if the push button 58 is pressed, the loose end of the axis member 60 abuts against the lock piece 100, so that the push button 58 cannot be pushed any further, and the operation member 54 is locked. As shown in FIG. 5(b), when the movable plate 94 is turned clockwise up to the operation-member unlock position, the lock piece 100 is disposed at a position deviating from the sliding direction of the axis member 60. At that time, as shown in FIG. 5(c), a user can push the push button 58. Consequently, the lock member 38 moves backward and the movable claw 40 moves to the release position, so that the lid body 12 moves to the open position by the torsion coil spring 25 provided in the hinge 24.

The operation-member lock mechanism 88 further includes a wire 104 for turning the movable plate 94; a tube 106 slidably holding the wire 104; and a key cylinder (not shown in the drawings) sliding the wire 104 relative to the tube 106 (similar to a Bowden cable). One end of the tube 106 slidably holding the wire 104 inwardly is fixed to the tube holding projecting piece 98 of the fixation plate 90. One end side of the wire 104 protrudes from one end of the tube 106 in a circumferential direction of the turning of the movable plate 94, and is held in the wire holding projecting piece 102 of the movable plate 94. Another end side of the wire 104 is attached to the key cylinder, and when a key is operated inside the key cylinder, a portion held in the wire holding projecting piece 102 of the wire 104 protrudes and enters with respect to the tube 106 so as to turn the movable plate 94 between the operation-member lock position and the operation-member unlock position. Thus, locking and unlocking of the operation member 54 can be switched.

Figure 8:
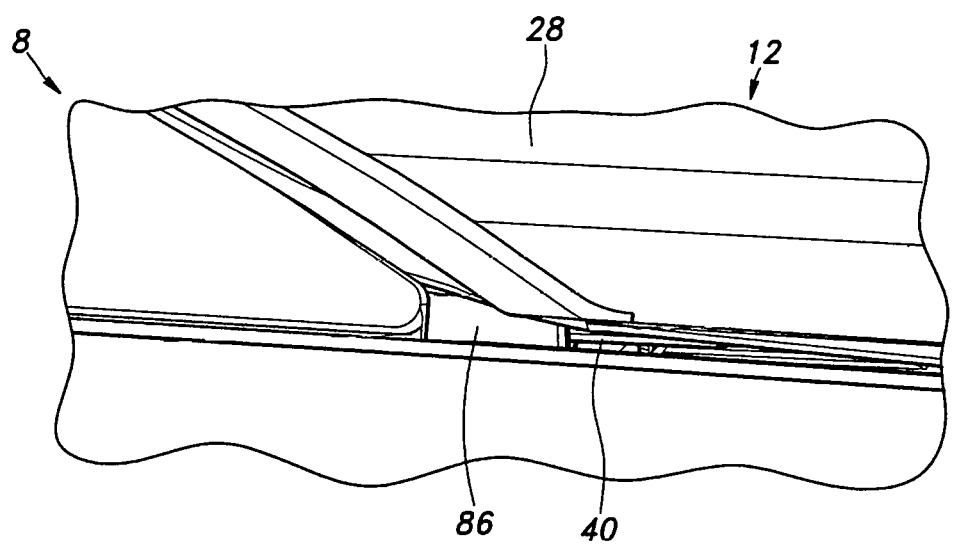
FIG. 8 is an enlarged side view in a state wherein the glove compartment is attached to the motorcycle according to the embodiment.

When the operation member 54 is not locked, a user can easily move the lid body 12 to the open position by pushing the push button 58. However, if the operation member 54 is not locked, a third party can easily move the lid body 12 to the open position as well, so that there is a high risk that an article housed in the glove compartment 2 may be stolen. On the other hand, a user locks the operation member 54 using the operation-member lock mechanism 88 in a state wherein the lid body 12 is located in the closed position so as to prevent a third party without the key from opening the lid body 12 using the push button 58. Also, at that time, as shown in FIG. 8, the front end side of the movable claw 40 is shielded by the shielding wall 86 viewed from the opening side portion side. Consequently, even if a third party attempts to open the lid body 12 by moving the movable claw 40 to the release position using a tool having a slender tip, the shielding wall 86 inhibits the tool from entering, so that the movable claw 40 cannot be moved. Thus, a theft of the article housed in the glove compartment 2 can be prevented. However, when a user attempts to move the lid body 12 to the open position from a state wherein the operation member 54 is locked, after a user releases the locking of the operation member 54 by inserting the key into the key cylinder and turning the key, a user is required to push the push button 58 so as to be slightly complicated. However, by using the locking and the unlocking of the operation member 54 properly according to a situation, a user can obtain both user-friendliness of opening/closing operations of the lid body 12 and a crime prevention property.

The specific embodiment has been explained above; however, the present invention is not limited to the aforementioned embodiment, and can be widely modified. For example, the lock member 38 including the movable claw 40 may be attached to the lid body 12, and the fixation claw 68 may be fixed to the case main body 10. Also, even in a case wherein the movable claw 40 is provided in any of the case main body 10 and the lid body 12, the shielding wall 86 may be provided in any of the lid body 12 and the case main body 10. Also, the movable claw 40 and the fixation claw 68 may be provided with one, or three or more, respectively. Also, the operation member 54 and the operation-member lock mechanism 88 may be omitted, and the lock member 38 may be moved by the key inserted into the key cylinder, and the lid body 12 may be moved from the closed position to the open position. Incidentally, the glove compartment 2 may be installed in another position of the motorcycle 4, and may be modified so as to be attached to another vehicle exterior or a convertible interior as well.

While the invention has been explained with reference to the specific embodiments of the invention, the explanation is illustrative and the invention is limited only by the appended claims.

What is claimed is:

1. A glove compartment provided in a vehicle and capable of storing an article, comprising:
   a case main body defining a storage chamber for storing the article;
   a lid body connected to the case main body by a hinge to open and close an opening of the storage chamber, and forming one portion of an outline of the vehicle;
   a lock mechanism for locking the lid body relative to the case main body at a closed position closing the opening of the storage chamber,
   wherein the lock mechanism includes:
      a fixation claw provided in one of the case main body or the lid body;
      a movable claw provided in another of the case main body or the lid body to be displaceable between an engagement position engaging with the fixation claw and a release position disengaging from the fixation claw; and
      an operation member displacing the movable claw from the engagement position to the release position; and
      a shielding wall disposed in the case main body or the lid body in such a way as to be positioned on an inner side more than the outline of the vehicle which the lid body forms, and near the movable claw on an outline side more than the movable claw when the lid body is located at the closed position; and
   the lock mechanism further includes an urging member urging the movable claw toward the engagement position, and in at least one of the fixation claw and the movable claw, an inclined face is provided, which, when the lid body is displaced toward the closed position, collides against another of corresponding fixation claw and movable claw to displace the movable claw into the release position against an urging force of the urging member.

2. A glove compartment according to claim 1, wherein the shielding wall is integrally formed with the fixation claw.

3. A glove compartment according to claim 1, wherein the fixation claw and the movable claw respectively include abutment faces wherein when the movable claw is located at the engagement position, at least one portion abuts against each other, and at least one of both abutment faces forms a projection piece extending along a displacement direction of the movable claw.

4. A glove compartment according to claim 1, wherein the vehicle is a motorcycle, and an outer surface of the lid body forms one portion of an outer outline of a cowl of the motorcycle.

5. A glove compartment provided in a vehicle and capable of storing an article, comprising:
   a case main body defining a storage chamber for storing the article;
   a lid body connected to the case main body by a hinge to open and close an opening of the storage chamber, and forming one portion of an outline of the vehicle;
   a lock mechanism for locking the lid body relative to the case main body at a closed position closing the opening of the storage chamber,
   wherein the lock mechanism includes:
      a fixation claw provided in one of the case main body or the lid body;
      a movable claw provided in another of the case main body or the lid body to be displaceable between an engagement position engaging with the fixation claw and a release position disengaging from the fixation claw; and
      an operation member displacing the movable claw from the engagement position to the release position; and
      a shielding wall disposed in the case main body or the lid body in such a way as to be positioned on an inner side more than the outline of the vehicle which the lid body forms, and near the movable claw on an outline side more than the movable claw when the lid body is located at the closed position; and
   the lock mechanism is provided in the case main body, and the movable claw is slidably provided in a direction approximately parallel to an axis line of the hinge on a side facing the hinge of the opening.

6. A glove compartment according to claim 5, wherein the fixation claw includes a plurality of fixation claw pieces provided at an interval in the direction approximately parallel to the axis line of the hinge, and the movable claw includes a plurality of movable claw pieces provided at an interval respectively in a long connection member slidably extending in the direction approximately parallel to the axis line of the hinge in such a way as to correspond to the plurality of fixation claw pieces.

7. A glove compartment according to claim 6, wherein the operation member includes:
- a push button disposed at a position defining one portion of the outline of the vehicle;
- a conversion mechanism converting a movement of the push button into a sliding movement of the connection member; and
- a movable lock piece provided to be displaceable into the case main body to selectively restrict a movement of the push button.

8. A glove compartment according to claim 5, wherein the case main body includes a flange where the lock mechanism is provided, on a marginal edge on a side facing the hinge,
- the movable claw protrudes upward from a hole provided in the flange, and
- the flange and a marginal edge on a side facing the hinge of the lid body respectively face in a direction orthogonal to the flange when the lid body is located in the closed position.

\* \* \* \* \*